July 1, 1941.                L. B. SEBRELL                2,247,925
                      GAS MASK AND OTHER CLOTHING
                         Filed March 26, 1938
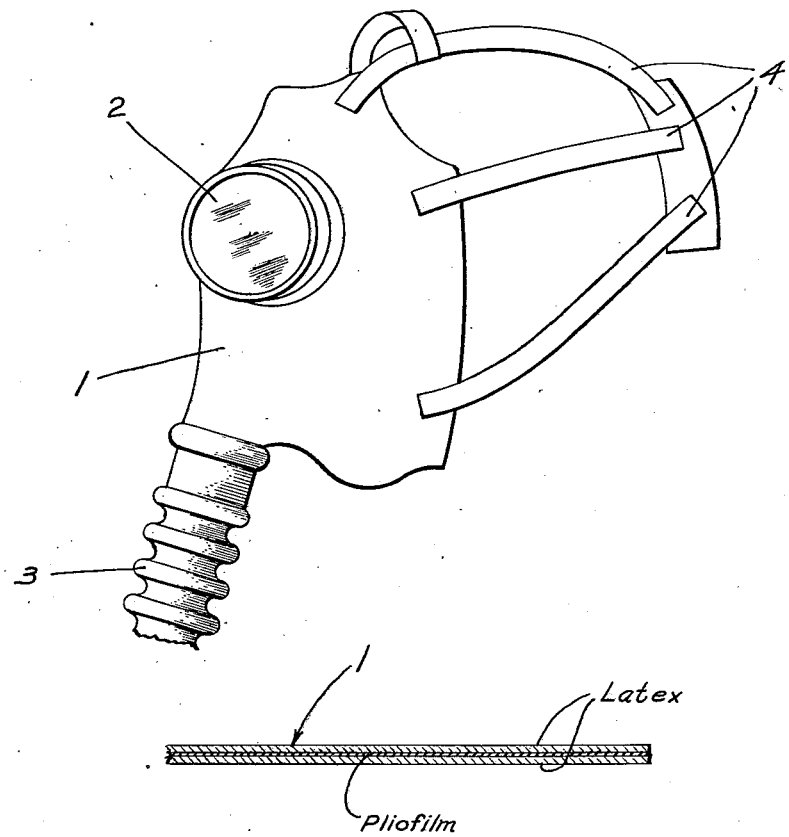
Inventor
Lorin B. Sebrell
By
Attorney Patented July 1, 1941

2,247,925

UNITED STATES PATENT OFFICE 2,247,925

GAS MASK AND OTHER CLOTHING

Lorin B. Sebrell, Silver Lake, Ohio, assignor to Wingfoot Corporation, Wilmington, Del., a corporation of Delaware Application March 26, 1938, Serial No. 198,278

4 Claims. (Cl. 128—141)

This invention relates to gas masks and other clothing in which a rubber hydrohalide film such as a rubber hydrochloride film is used to protect the body from war gases and vapors.

The clothing may be of any usual design. Seams may be made by the use of adhesives. A thoroughly tight seam may be made by pressing overlapping portions of the rubber hydrochloride film together while heating to a temperature at which the film becomes sticky. In this way the two films may be caused to coalesce and form an absolutely tight seam. Coats, pants, gloves, masks, etc. may be made of any usual design with a film of the rubber hydrochloride which is preferably covered on one or both sides with some protective cover. A film of rubber deposited from latex is preferred as the protective covering. The invention will be described more particularly as applied to the construction of a gas mask.

The gas mask may be of any usual or new design and any usual or new cannister may be used in connection with it. The rubber hydrochloride film covers the face and protects the face from gases and vapors. The rubber hydrochloride film may be of any desired shape and apertures may be provided for connection with the cannister and for the insertion of eye pieces, etc.

In a preferred form of the invention the rubber hydrochloride is protected on both sides with a film of rubber, preferably rubber deposited from latex. The rubber hydrochloride film is somewhat extensible but only slightly elastic. However, when covered with rubber it is found that the laminated structure can be stretched to a considerable extent and has substantially the same elasticity as the rubber covering. As rubber hydrochloride film is highly resistant to the passage of gases and vapors, and is not attacked by known war gases and vapors it forms a very desirable gas mask, particularly when laminated with rubber. Its resistance to the passage of gases and vapors is not materially affected by flexing or creasing. Furthermore, rubber hydrochloride becomes sticky when heated and it can be joined to other materials, such as the cannister-connecting tube by heating, without the use of an adhesive, and the bond thus formed is as resistant to the passage of gases and vapors as the film itself.

One form of gas mask is illustrated in Fig. 1 of the accompanying drawing. In Fig. 2 is shown a sectional view of the coated film used in making the mask. The mask may be of any desired design. The face piece 1 is of rubber hydrochloride film, preferably coated on both sides with rubber deposited from latex, as shown in Fig. 2. Eye pieces 2 and the connection 3 for the cannister may be of the usual construction. The straps 4 may be of any usual construction.

The rubber hydrochloride film may be made in any usual way. For example it may be formed by spreading a rubber hydrochloride cement on a smooth surface and allowing the solvent to evaporate to produce the film. The rubber hydrochloride may be plasticized with desirable plasticizing agents. Other materials such as the photochemical inhibitors of Calvert 1,989,632 may be added. In any event the film is composed essentially of rubber hydrochloride. A film one thousandth of an inch thick is satisfactory although a somewhat thicker film may be used to give greater resistance to the penetration of gases and vapors. Instead of first forming the film on a smooth surface and then removing it for lamination with the rubber, a solution or cement of rubber hydrochloride may be spread on a rubber film. This rubber film may be composed of rubber deposited from latex. The exposed rubber hydrochloride surface may then be coated by the deposition of rubber from latex.

According to an alternative method of preparation rubber hydrochloride film may be coated on both sides with rubber by applying a rubber solution or cement thereto. This rubber solution may contain vulcanizing agents so as to produce vulcanized rubber films. In the preferred form of the invention the film is coated on both sides with a layer of unvulcanized rubber which is deposited from latex. Instead of coating the film with rubber other materials may be employed. For example, a strong cloth or cloth netting may be used, firmly united to the rubber hydrochloride by a suitable adhesive bond in such a way as to prevent the rubber hydrochloride from becoming stretched out of shape. As the rubber hydrochloride is stretchable, it is desirable (1) to prevent it from stretching by uniting it with some nonstretchable material or (2) to coat it with rubber to produce an elastic laminated sheet. If desired, the mask may be stiffened in any suitable manner to facilitate breathing.

The eye pieces may be made of any usual construction and a tight seam may be formed between the mask and the eye piece construction in the manner in which eye pieces have formerly been joined to rubber. By heating the rubber hydrochloride to make it soft and sticky the rubber hydrochloride may be firmly united to any suitable part of the eyepiece structure. In a similar way a gas- and vapor-tight connection may be made between the rubber hydrochloride film and the connection leading to the cannister.

Instead of providing separate eye pieces it is possible to use merely the rubber hydrochloride film itself. The film is transparent and by leaving the portion of the mask over the eyes in an uncoated condition the film itself may be used for the eye pieces and the construction of the mask may be thus greatly simplified and the danger of leakage around inserted eye pieces is thereby entirely eliminated.

In making the coats, etc. of this invention any usual types of fastening means, etc. may be provided. Various designs may be used. Seams between two pieces of rubber hydrochloride film or two portions of the same film may be made with heat under pressure. If preferred a tight seam may be made by pressing together portions of film which have been softened with solvent, for example chloroform, benzene, acetylene tetrachloride, 1-1-2 trichlor ethane, ethylene dichloride mono-chlor-benzene, o-chlor toluene, dichlorbenzene or tri-chlor-ethylene. A suitable adhesive such as a latex adhesive or a rubber hydrochloride cement may be used. The rubber laminae may be united by rubber adhesives.

Although the invention has been more particularly described as applied to the use of a rubber hydrochloride film other rubber hydrohalide films such as rubber hydrobromide film may be used.

I claim:

1. War clothing which comprises rubber hydrochloride film to make it gas and vapor tight, said film being coated with a non-tacky coating of rubber from latex.

2. War clothing as in claim 1, characterized by the fact that the rubber hydrochloride film is coated on both sides with rubber deposited from latex.

3. War clothing as in claim 1 characterized by the fact that it comprises several films of rubber hydrochloride, the seams between which are united by coalescence of the rubber hydrochloride in the films.

4. A gas mask the face piece of which is composed of the coated film defined in claim 1.

LORIN B. SEBRELL.